US011283632B2

(12) United States Patent
Nishimae et al.

(10) Patent No.: US 11,283,632 B2
(45) Date of Patent: Mar. 22, 2022

(54) INTEGRATED CIRCUIT, CONTROL DEVICE, INFORMATION DISTRIBUTION METHOD, AND INFORMATION DISTRIBUTION SYSTEM

(71) Applicant: MITSUBISHI HEAVY INDUSTRIES, LTD., Tokyo (JP)

(72) Inventors: Etsuji Nishimae, Tokyo (JP); Fumikado Anzai, Tokyo (JP); Naruhisa Kameo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 213 days.

(21) Appl. No.: 16/229,958

(22) Filed: Dec. 21, 2018

(65) Prior Publication Data

US 2019/0207775 A1 Jul. 4, 2019

(30) Foreign Application Priority Data

Dec. 28, 2017 (JP) ............................ JP2017-254788

(51) Int. Cl.
*H04L 9/08* (2006.01)
*H04L 9/32* (2006.01)
(Continued)

(52) U.S. Cl.
CPC ............ *H04L 9/3278* (2013.01); *G06F 21/14* (2013.01); *G06F 21/81* (2013.01); *H04L 9/088* (2013.01);
(Continued)

(58) Field of Classification Search
CPC ... H04L 9/0825; H04L 9/0866; H04L 9/3278; H04L 9/30; G06F 21/81; G06F 2221/0797
See application file for complete search history.

(56) References Cited

U.S. PATENT DOCUMENTS 7,971,072 B1 * 6/2011 Donlin .................... G06F 21/76 713/194
9,225,512 B1 * 12/2015 Trimberger ........... H04L 9/0866
(Continued)

FOREIGN PATENT DOCUMENTS

EP 3 336 887 6/2018
JP 2001-251293 9/2001
(Continued)

OTHER PUBLICATIONS

A PUF-Based Secure Communication Protocol for IoT, Chatterjee et al., Apr. 2017, ACM Transactions on Embedded Computing Systems, vol. 16, No. 3, Article 67 (Year: 2017).*

*Primary Examiner* — David J Pearson
(74) *Attorney, Agent, or Firm* — Wenderoth, Lind & Ponack, L.L.P.

(57) ABSTRACT

The integrated circuit includes a CPU configured to operate according to a program, a PUF information output unit configured to output PUF information while power is being supplied, a key pair output unit configured to output a public key and a private key based on the PUF information while power is being supplied, a public key transmitter configured to transmit the public key output from the key pair output unit to the outside, and a shared encryption key decryption unit configured to decrypt encrypted information produced through encryption with the public key and received from the outside with the private key output from the key pair output unit.

7 Claims, 9 Drawing Sheets

(51) Int. Cl.
*G06F 21/81* (2013.01)
*G06F 21/14* (2013.01)
*H04L 9/30* (2006.01)

(52) U.S. Cl.
CPC .......... *H04L 9/0866* (2013.01); *H04L 9/0891* (2013.01); *H04L 9/30* (2013.01); *G06F 2221/0797* (2013.01); *H04L 9/0825* (2013.01)

(56) References Cited

U.S. PATENT DOCUMENTS

| | | | | |
|---|---|---|---|---|
| 10,009,325 | B1 * | 6/2018 | David | H04L 9/0866 |
| 2013/0047209 | A1 | 2/2013 | Satoh et al. | |
| 2013/0093502 | A1 | 4/2013 | Kim et al. | |
| 2013/0127442 | A1 | 5/2013 | Satoh et al. | |
| 2014/0093074 | A1 * | 4/2014 | Gotze | H04L 9/3278 380/45 |
| 2015/0113278 | A1 * | 4/2015 | Cocchi | H04L 9/3247 713/171 |
| 2015/0188707 | A1 | 7/2015 | Gehrer et al. | |
| 2016/0026799 | A1 | 1/2016 | Hershman et al. | |
| 2016/0140357 | A1 * | 5/2016 | Newell | G06F 21/79 726/2 |
| 2016/0330038 | A1 | 11/2016 | Kim et al. | |
| 2016/0335458 | A1 | 11/2016 | Kim et al. | |
| 2016/0373264 | A1 | 12/2016 | Katoh | |
| 2017/0134176 | A1 | 5/2017 | Kim et al. | |
| 2017/0149572 | A1 * | 5/2017 | Wallrabenstein | G06F 21/34 |
| 2017/0187537 | A1 | 6/2017 | Kim et al. | |
| 2017/0255503 | A1 | 9/2017 | Hori et al. | |
| 2018/0115723 | A1 | 4/2018 | Takayanagi et al. | |
| 2018/0183590 | A1 * | 6/2018 | Kuo | H04L 9/14 |
| 2019/0028282 | A1 * | 1/2019 | Sharifi | G11C 29/52 |
| 2019/0087577 | A1 * | 3/2019 | Doliwa | G06F 21/602 |
| 2019/0097818 | A1 * | 3/2019 | Lu | H04L 9/3263 |
| 2019/0190703 | A1 * | 6/2019 | Lekkas | H04L 63/00 |

FOREIGN PATENT DOCUMENTS

| | | |
|---|---|---|
| JP | 2003-337753 | 11/2003 |
| JP | 2007-215104 | 8/2007 |
| JP | 2010-182070 | 8/2010 |
| JP | 2016-526344 | 9/2016 |
| JP | 2016-181927 | 10/2016 |
| JP | 2017-11678 | 1/2017 |
| JP | 2017-33537 | 2/2017 |
| JP | 2017-505047 | 2/2017 |
| JP | 2017-508173 | 3/2017 |
| JP | 2017-511095 | 4/2017 |
| JP | 2017-512337 | 5/2017 |
| JP | 2017-514190 | 6/2017 |
| JP | 2017-514421 | 6/2017 |
| JP | 2017-519350 | 7/2017 |
| WO | 2011/118548 | 9/2011 |
| WO | 2012/014623 | 2/2012 |
| WO | 2014/193496 | 12/2014 |
| WO | 2015/098207 | 7/2015 |
| WO | 2015/102253 | 7/2015 |
| WO | 2015/102359 | 7/2015 |
| WO | 2015/116288 | 8/2015 |
| WO | 2015/124673 | 8/2015 |
| WO | 2015/134037 | 9/2015 |
| WO | 2015/150739 | 10/2015 |
| WO | 2015/156621 | 10/2015 |
| WO | 2015/156622 | 10/2015 |
| WO | 2016/031682 | 3/2016 |
| WO | 2016/167076 | 10/2016 |
| WO | 2017-501652 | 1/2017 |
| WO | 2017/026350 | 2/2017 |

* cited by examiner

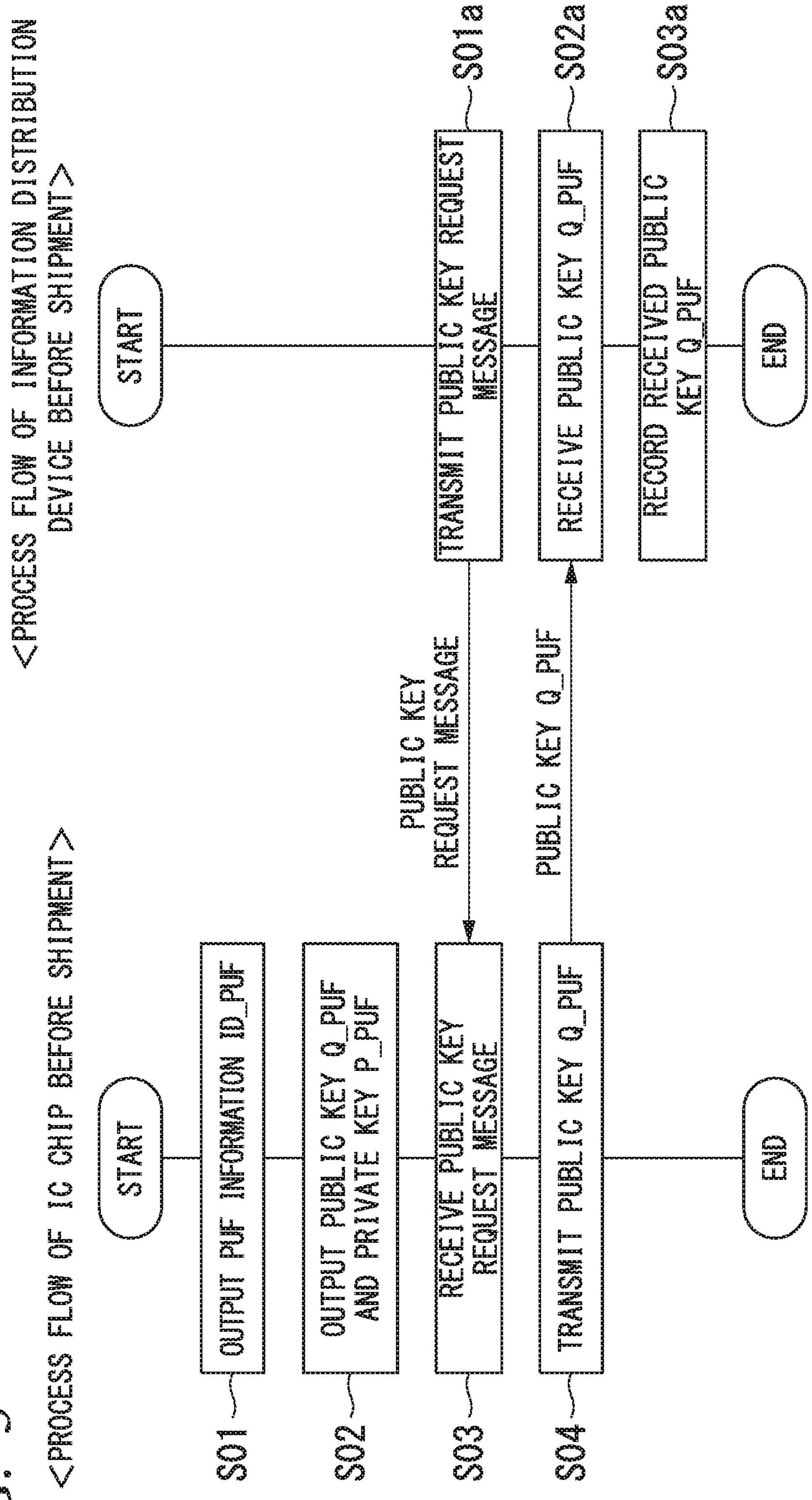
FIG. 3
<PROCESS FLOW OF IC CHIP BEFORE SHIPMENT>
START
S01
OUTPUT PUF INFORMATION ID_PUF
S02
OUTPUT PUBLIC KEY Q_PUF AND PRIVATE KEY P_PUF
S03
RECEIVE PUBLIC KEY REQUEST MESSAGE
S04
TRANSMIT PUBLIC KEY Q_PUF
END
PUBLIC KEY REQUEST MESSAGE
PUBLIC KEY Q_PUF
<PROCESS FLOW OF INFORMATION DISTRIBUTION DEVICE BEFORE SHIPMENT>
START
S01a
TRANSMIT PUBLIC KEY REQUEST MESSAGE
S02a
RECEIVE PUBLIC KEY Q_PUF
S03a
RECORD RECEIVED PUBLIC KEY Q_PUF
END

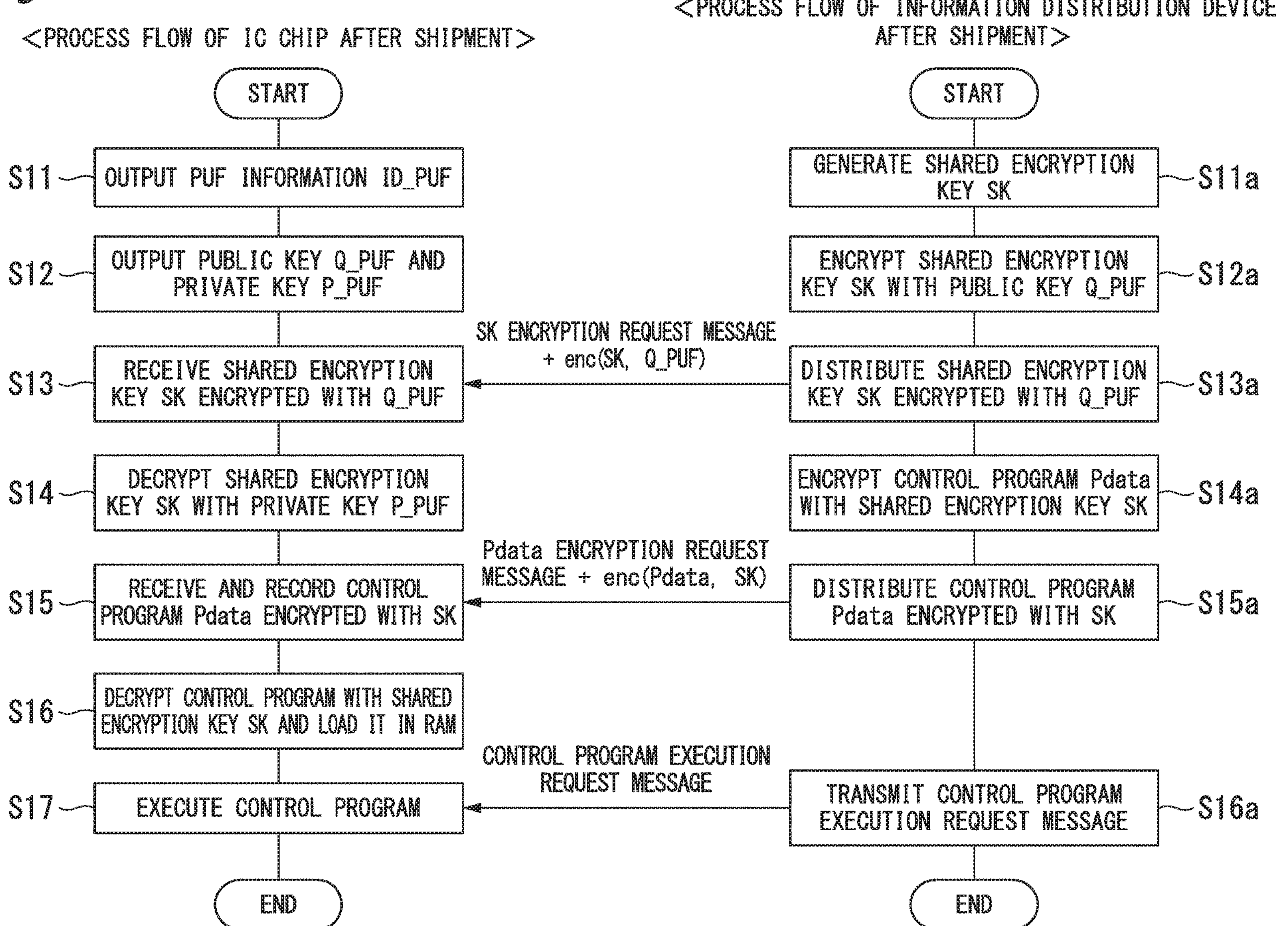
FIG. 5
<PROCESS FLOW OF IC CHIP AFTER SHIPMENT>
START
OUTPUT PUF INFORMATION ID_PUF
S11
OUTPUT PUBLIC KEY Q_PUF AND PRIVATE KEY P_PUF
S12
RECEIVE SHARED ENCRYPTION KEY SK ENCRYPTED WITH Q_PUF
S13
DECRYPT SHARED ENCRYPTION KEY SK WITH PRIVATE KEY P_PUF
S14
RECEIVE AND RECORD CONTROL PROGRAM Pdata ENCRYPTED WITH SK
S15
DECRYPT CONTROL PROGRAM WITH SHARED ENCRYPTION KEY SK AND LOAD IT IN RAM
S16
EXECUTE CONTROL PROGRAM
S17
END
<PROCESS FLOW OF INFORMATION DISTRIBUTION DEVICE AFTER SHIPMENT>
START
GENERATE SHARED ENCRYPTION KEY SK
S11a
ENCRYPT SHARED ENCRYPTION KEY SK WITH PUBLIC KEY Q_PUF
S12a
DISTRIBUTE SHARED ENCRYPTION KEY SK ENCRYPTED WITH Q_PUF
S13a
ENCRYPT CONTROL PROGRAM Pdata WITH SHARED ENCRYPTION KEY SK
S14a
DISTRIBUTE CONTROL PROGRAM Pdata ENCRYPTED WITH SK
S15a
TRANSMIT CONTROL PROGRAM EXECUTION REQUEST MESSAGE
S16a
END
SK ENCRYPTION REQUEST MESSAGE + enc(SK, Q_PUF)
Pdata ENCRYPTION REQUEST MESSAGE + enc(Pdata, SK)
CONTROL PROGRAM EXECUTION REQUEST MESSAGE

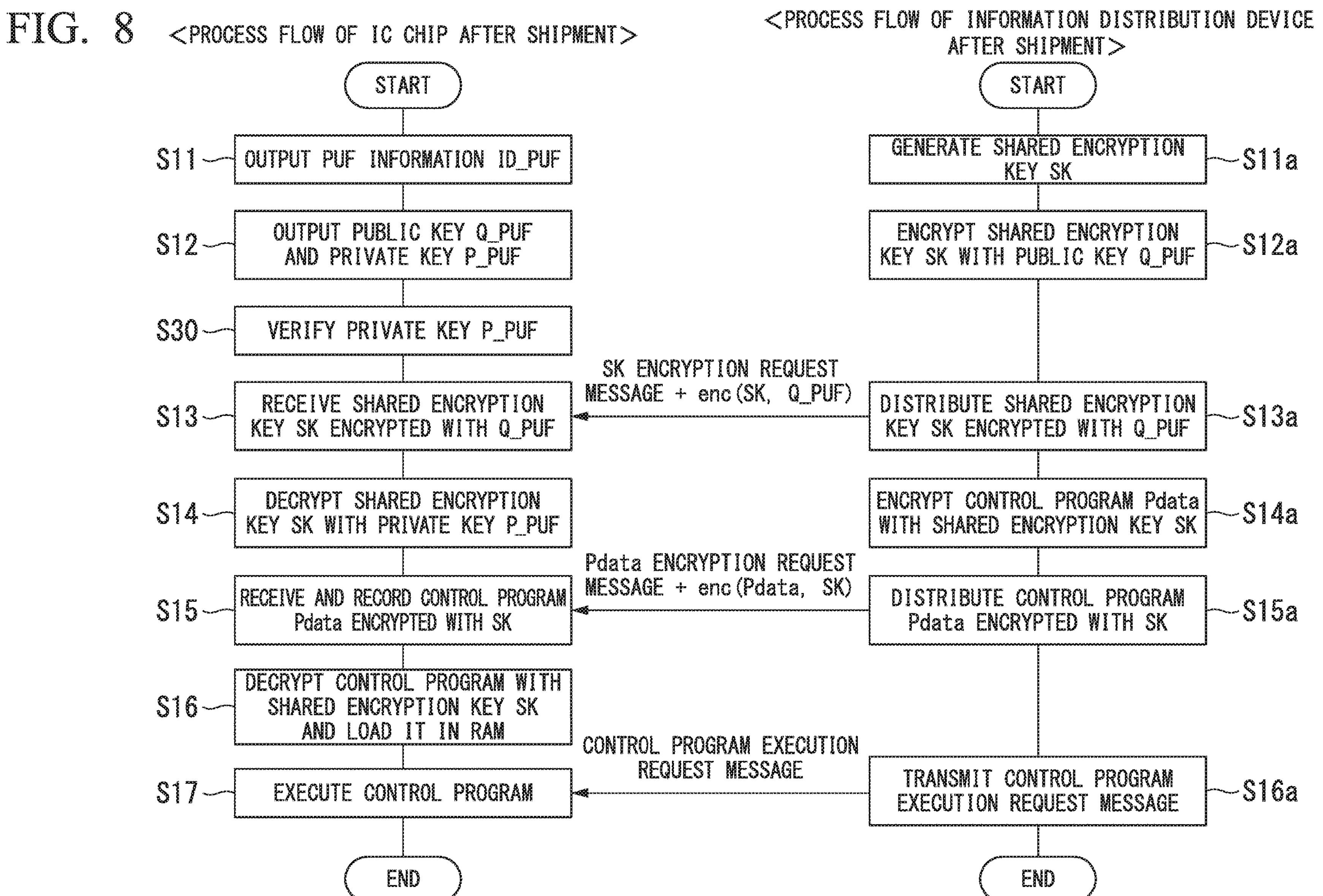
FIG. 8
<PROCESS FLOW OF IC CHIP AFTER SHIPMENT>
START
S11 OUTPUT PUF INFORMATION ID_PUF
S12 OUTPUT PUBLIC KEY Q_PUF AND PRIVATE KEY P_PUF
S30 VERIFY PRIVATE KEY P_PUF
S13 RECEIVE SHARED ENCRYPTION KEY SK ENCRYPTED WITH Q_PUF
S14 DECRYPT SHARED ENCRYPTION KEY SK WITH PRIVATE KEY P_PUF
S15 RECEIVE AND RECORD CONTROL PROGRAM Pdata ENCRYPTED WITH SK
S16 DECRYPT CONTROL PROGRAM WITH SHARED ENCRYPTION KEY SK AND LOAD IT IN RAM
S17 EXECUTE CONTROL PROGRAM
END
<PROCESS FLOW OF INFORMATION DISTRIBUTION DEVICE AFTER SHIPMENT>
START
S11a GENERATE SHARED ENCRYPTION KEY SK
S12a ENCRYPT SHARED ENCRYPTION KEY SK WITH PUBLIC KEY Q_PUF
S13a DISTRIBUTE SHARED ENCRYPTION KEY SK ENCRYPTED WITH Q_PUF
S14a ENCRYPT CONTROL PROGRAM Pdata WITH SHARED ENCRYPTION KEY SK
S15a DISTRIBUTE CONTROL PROGRAM Pdata ENCRYPTED WITH SK
S16a TRANSMIT CONTROL PROGRAM EXECUTION REQUEST MESSAGE
END
SK ENCRYPTION REQUEST MESSAGE + enc(SK, Q_PUF)
Pdata ENCRYPTION REQUEST MESSAGE + enc(Pdata, SK)
CONTROL PROGRAM EXECUTION REQUEST MESSAGE

INTEGRATED CIRCUIT, CONTROL DEVICE, INFORMATION DISTRIBUTION METHOD, AND INFORMATION DISTRIBUTION SYSTEM

TECHNICAL FIELD

The present disclosure relates to an integrated circuit, a control device, an information distribution method, and an information distribution system. Priority is claimed on Japanese Patent Application No. 2017-254788, filed Dec. 28, 2017, the content of which is incorporated herein by reference.

BACKGROUND ART

As methods of protecting software of an embedded system, a method of protecting the software with encryption using a trusted platform module (TPM) and a method of detecting environmental changes and deleting the software have been proposed. A so-called physically unclonable function (PUF), with which physical values such as differences in physical characteristics or manufacturing variations of a semiconductor chip are output as unique values of the semiconductor chip to be used for authenticity determination, has also been suggested (see, for example, Patent Literature 1).

CITATION LIST

Patent Literature

[Patent Literature 1]
Japanese Unexamined Patent Application, First Publication No. 2010-182070

SUMMARY

In a certain embedded system, a control program for a control device may be developed and managed at a domestic factory or the like of the manufacturer, whereas hardware for the control device may be produced at an overseas production base or the like. In this case, the manufacturer will distribute the control program developed at the domestic factory or the like via a wide area communication network to the overseas production base and implement the control program on the hardware at the production base. However, when the control program is distributed overseas, it may be tapped by a third party. Thus, there is concern about the risk that the control program could be tapped and analyzed in detail, resulting in leakage of the manufacturer's know-how.

An object of the present invention is to provide an integrated circuit, a control device, an information distribution method, and an information distribution system which can reduce the risk of leakage of information to be protected such as a control program.

According to a first aspect of the present invention, an integrated circuit includes a controller configured to operate according to a program, a PUF information output unit configured to output PUF information while power is being supplied, a key pair output unit configured to output a public key and a private key based on the PUF information while power is being supplied, a public key transmitter configured to transmit the public key output from the key pair output unit to an outside, and a decryption unit configured to decrypt encrypted information produced through encryption with the public key and received from the outside with the private key output from the key pair output unit.

According to a second aspect of the present invention, the public key transmitter is configured to transmit the public key output from the key pair output unit to the outside before shipment, and the decryption unit is configured to decrypt the encrypted information received from the outside with the private key output from the key pair output unit after shipment.

According to a third aspect of the present invention, the decryption unit is configured to decrypt a shared encryption key, with which information to be protected is encrypted, as the encrypted information with the private key output from the key pair output unit.

According to a fourth aspect of the present invention, the integrated circuit further includes a nonvolatile memory, wherein the controller is configured to record the public key output from the key pair output unit in the nonvolatile memory before shipment, determine whether or not the public key output from the key pair output unit matches the public key recorded in the nonvolatile memory after shipment, and determine whether or not the private key has been correctly output from the key pair output unit after shipment on the basis of a result of the determination.

According to a fifth aspect of the present invention, in the integrated circuit according to the fourth aspect of the present invention, the PUF information output unit is configured to output changed PUF information obtained by changing a part of the output PUF information if a correct private key is not output from the key pair output unit after shipment, the key pair output unit is configured to output a changed public key and a changed private key based on the changed PUF information, the controller is configured to determine whether or not the changed public key output from the key pair output unit matches the public key recorded in the nonvolatile memory, and the decryption unit is configured to decrypt the encrypted information received from the outside with the changed private key if the changed public key matches the public key recorded in the nonvolatile memory.

According to a sixth aspect of the present invention, the integrated circuit according to any one of the first to fifth aspects further includes a tamper resistant detector configured to detect unauthorized interference, and a power management unit configured to cut off power supply when unauthorized interference has been detected.

According to a seventh aspect of the present invention, a control device includes the integrated circuit described above.

According to an eighth aspect of the present invention, an information distribution method for distributing information to the integrated circuit described above includes the steps of supplying power to the integrated circuit and causing the integrated circuit to transmit a public key based on PUF information to the outside before shipment of the integrated circuit, generating encrypted information through encryption with the public key received from the integrated circuit, and supplying power to the integrated circuit and causing the integrated circuit to receive the encrypted information from the outside and to decrypt the encrypted information with the private key based on the PUF information after shipment of the integrated circuit.

According to a ninth aspect of the present invention, an information distribution system includes the integrated circuit described above and an information distribution device, wherein the information distribution device is configured to record the public key received from the integrated circuit, and generate the encrypted information using the recorded public key and distribute the encrypted information to the integrated circuit.

According to each aspect of the present invention described above, it is possible to reduce the risk of leakage of information to be protected.

BRIEF DESCRIPTION OF DRAWINGS

FIG. 3 is a first process flow executed by the IC chip and an information distribution device according to the first embodiment.

FIG. 5 is a second process flow executed by the IC chip and the information distribution device according to the first embodiment.

FIG. 8 is a second process flow executed by the IC chip and the information distribution device according to the second embodiment.

DESCRIPTION OF EMBODIMENTS

First Embodiment

Hereinafter, an IC chip (an integrated circuit) according to a first embodiment will be described with reference to FIGS. 1 to 6.

(Outline of Manufacturing Process of Control Device)

Figure 1:
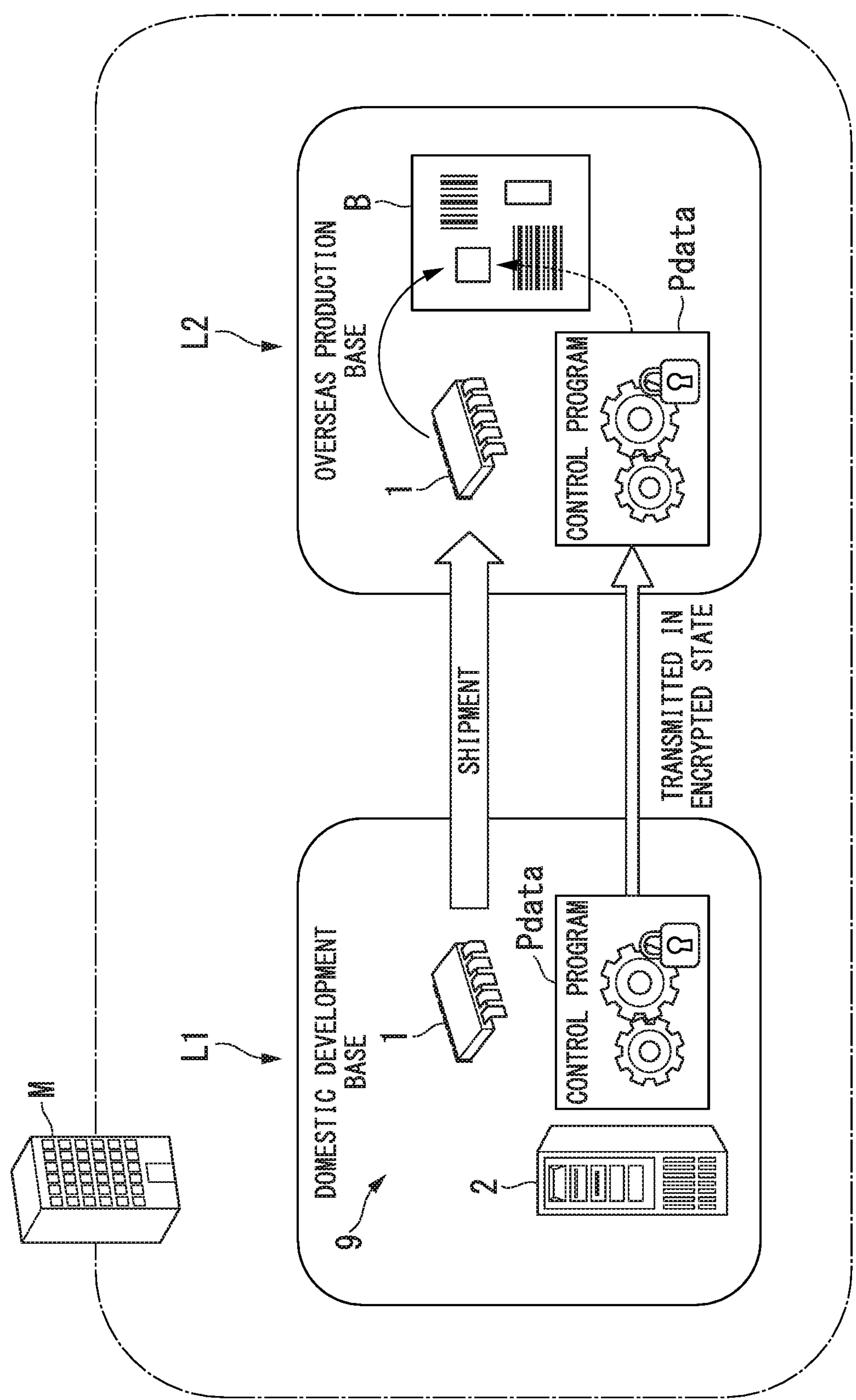
FIG. 1 is a diagram showing an outline of a manufacturing process for a control device according to a first embodiment.

FIG. 1 is a diagram showing an outline of a manufacturing process for a control device according to the first embodiment.

In the first embodiment, a manufacturer M produces a control device for controlling, for example, a gas turbine or a boiler. The control device includes an IC chip 1 (an integrated circuit) operating with a control program Pdata.

An information distribution system 9 shown in FIG. 1 has the IC chip 1 and an information distribution device 2 which will be described below.

As shown in FIG. 1, the IC chip 1 is manufactured at a development factory owned by the manufacturer M in a domestic country (hereinafter also referred to as a "domestic development base L1"). The control program Pdata for operating the IC chip 1 is also developed at the domestic development base L1. In the present embodiment, the control program Pdata includes much know-how of the manufacturer M. Therefore, the domestic development base L1 ensures sufficient security such that information on the developed control program Pdata and the like do not leak to the outside.

As shown in FIG. 1, hardware (a control board B) of the control device is produced, for example, at a production factory owned by the manufacturer M overseas (hereinafter also referred to as an "overseas production base L2"). The manufacturer M ships the IC chip 1 manufactured at the domestic development base L1 to the overseas production base L2. At the overseas production base L2, the IC chip 1 shipped from the domestic development base L1 is mounted on the control board B.

As shown in FIG. 1, the information distribution device 2 is installed at the domestic development base L1. The information distribution device 2 distributes the control program Pdata to the IC chip 1 mounted at the overseas production base L2 through a wide area communication network (for example, an internet line or the like). Here, since there is a possibility that the wide area communication network may be tapped by a third party, the control program Pdata is transmitted in a state of being encrypted with a predetermined encryption key (a shared encryption key SK which will be described later). In the following description, the control program Pdata encrypted with the shared encryption key SK will also be referred to as an "encrypted control program enc (Pdata, SK)."

The IC chip 1 which has been mounted on the control board B receives the encrypted control program enc (Pdata, SK) from the information distribution device 2 installed at the domestic development base L1 and records the encrypted control program enc (Pdata, SK) in a nonvolatile memory (a flash ROM 18 which will be described later) provided in the IC chip 1.

When actually operating as a control device, the IC chip 1 mounted on the control board B decrypts the encrypted control program enc (Pdata, SK) recorded in the flash ROM 18 and loads the decrypted control program Pdata into a volatile memory (a RAM 17 which will be described later) provided in the IC chip 1. A CPU (a CPU 10 which will be described later) of the IC chip 1 operates according to the decrypted control program Pdata.

It is to be noted that, at the domestic development base L1, individual identification information (such as a serial number) of the IC chip 1 and a public key Q_PUF (which will be described later) which is uniquely output from the IC chip 1 are associated and recorded in the information distribution device 2, prior to shipment of the IC chip 1.

(Functional Configuration of IC Chip)

Figure 2:
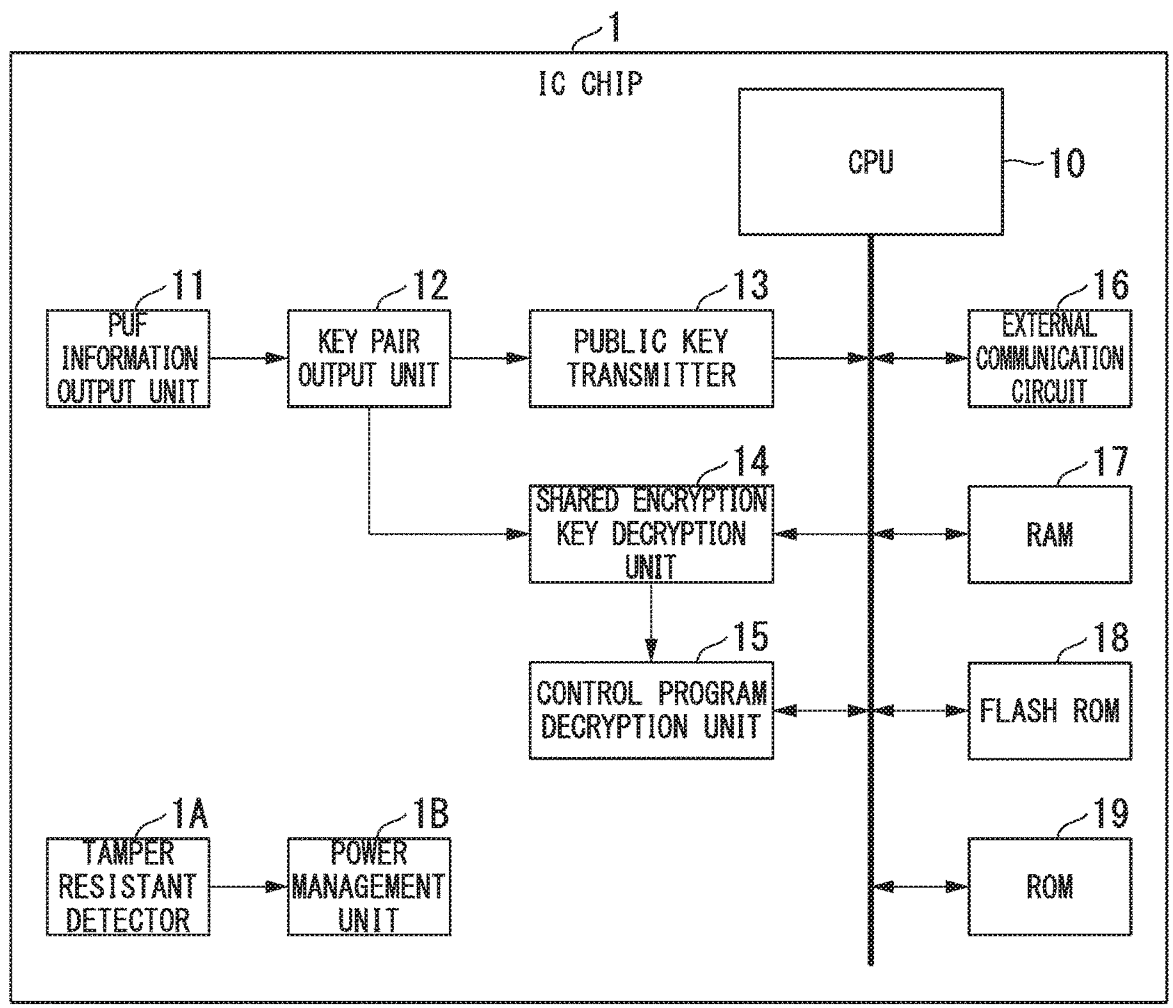
FIG. 2 is a diagram showing a functional configuration of an IC chip according to the first embodiment.

FIG. 2 is a diagram showing a functional configuration of the IC chip according to the first embodiment.

As shown in FIG. 2, the IC chip 1 includes a CPU 10 (controller), a PUF information output unit 11, a key pair output unit 12, a public key transmitter 13, a shared encryption key decryption unit 14, a control program decryption unit 15, an external communication circuit 16, a RAM 17, a flash ROM 18, a ROM 19, a tamper resistant detector 1A, and a power management unit 1B.

The CPU 10 is a processor that governs the entire operation of the IC chip 1. The CPU 10 operates according to a program loaded into the volatile memory (RAM 17) which will be described later.

The PUF information output unit 11 outputs physically unclonable function (PUF) information ID_PUF to the key pair output unit 12 while power is being supplied to the IC chip 1. The PUF information is information that is uniquely generated according to variations in physical or electrical characteristics occurring in the manufacturing process of the IC chip 1 and differs for each individual IC chip 1. A known PUF technique (for example, that of SRAM_PUF or glitch PUF) may be applied to the PUF information output unit 11 according to the present embodiment. Further, it is assumed that the PUF information output unit 11 according to the present embodiment outputs PUF information ID_PUF having a data string of 128 bits. However, without being limited to this aspect, the data string may be longer or shorter than 128 bits in other embodiments.

While power is being supplied to the IC chip 1, the key pair output unit 12 generates a public key Q_PUF and a private key P_PUF on the basis of the PUF information ID_PUF output from the PUF information output unit 11. The public key Q_PUF is used when encrypting information to be protected (the shared encryption key SK which will be described later in the present embodiment). The information encrypted with the public key Q_PUF generated on the basis of the PUF information ID_PUF can be decrypted only with the private key P_PUF generated on the basis of the same PUF information ID_PUF.

The key pair output unit 12 outputs the generated public key Q_PUF to the public key transmitter 13 and outputs the generated private key P_PUF to the shared encryption key decryption unit 14.

The public key transmitter 13 is a functional component for transmitting the public key Q_PUF output from the key pair output unit 12 to the outside (the information distribution device 2) before shipment of the IC chip 1. Specifically, the public key transmitter 13 makes the CPU 10 accessible to the public key Q_PUF output from the key pair output unit 12.

After shipment of the IC chip 1, the shared encryption key decryption unit 14 decrypts encrypted information received from the outside (the information distribution device 2) with the private key P_PUF output from the key pair output unit 12. Here, the "encrypted information" is information encrypted with the public key Q_PUF. In particular, in the present embodiment, the "encrypted information" is a shared encryption key SK encrypted with the public key Q_PUF. In the following description, the shared encryption key SK encrypted with the public key Q_PUF will also be referred to as an "encrypted shared encryption key enc (SK, Q_PUF)."

The shared encryption key decryption unit 14 outputs the decrypted shared encryption key SK to the control program decryption unit 15.

The control program decryption unit 15 decrypts the encrypted control program enc (Pdata, SK) with the shared encryption key SK and loads the decrypted control program into the RAM 17.

The external communication circuit 16 is a communication interface for communicating with the outside of the IC chip 1 (in particular, with the information distribution device 2). The external communication circuit 16 is made accessible only by the CPU 10, and thus information loaded into the RAM 17 or information output from the PUF information output unit 11 and the key pair output unit 12 is not accessible directly from the outside via the external communication circuit 16.

The RAM 17 is a volatile memory to which information is rewritable. The RAM 17 is a so-called main memory device, into which a program for operating the CPU 10 is loaded. In particular, a control program Pdata for operating the CPU 10 as a control device is loaded into the RAM 17.

The flash ROM 18 is a nonvolatile memory to which information is rewritable. The encrypted control program enc (Pdata, SK) received from the information distribution device 2 is stored in the flash ROM 18 according to the present embodiment.

The ROM 19 is a nonvolatile memory to which information is not rewritable. A boot program of the CPU 10 is stored in advance in the ROM 19. The boot program stored in the ROM 19 is a program for executing a process flow (which will be described later) for securely transmitting the control program Pdata to the IC chip 1 in the manufacturing process of the control device.

The tamper resistant detector 1A is a sensor that detects unauthorized interference with the IC chip 1.

Upon receiving a detection signal from the tamper resistant detector 1A, the power management unit 1B cuts off power supply to the IC chip 1.

(Process Flow Before Shipment)

FIG. 3 is a first process flow executed by the IC chip and the information distribution device according to the first embodiment.

Figure 4:
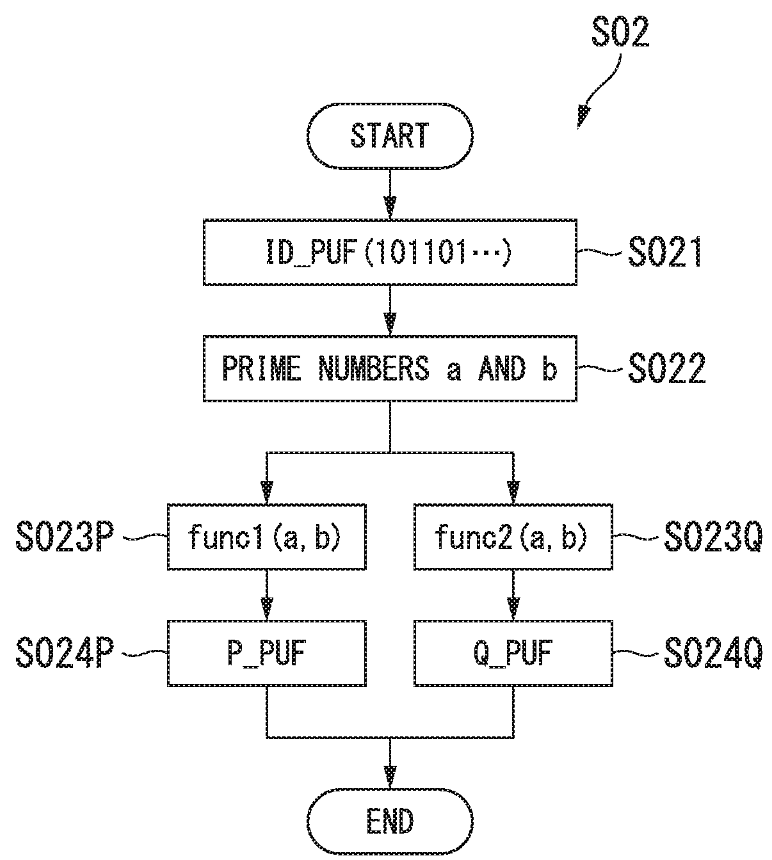
FIG. 4 is a diagram showing a process flow executed by a key pair output unit according to the first embodiment.

FIG. 4 is a diagram showing a process flow executed by the key pair output unit according to the first embodiment.

Hereinafter, a process flow executed by the IC chip 1 and the information distribution device 2 before shipment of the IC chip 1 will be described in detail with reference to FIGS. 3 and 4.

The first process flow shown in FIG. 3 is executed at the domestic development base L1 before shipment of an IC chip 1 whose manufacturing process has been completed.

When power is supplied to the IC chip 1 at the domestic development base L1, the PUF information output unit 11 of the IC chip 1 outputs PUF information ID_PUF unique to the IC chip 1 to the key pair output unit 12 (step S01).

Next, the key pair output unit 12 that has received an input of the PUF information ID_PUF from the PUF information output unit 11 generates a key pair (a pair of a public key Q_PUF and a private key P_PUF) based on the PUF information ID_PUF (step S02).

Here, the process of step S02 executed by the key pair output unit 12 will be described in detail with reference to FIG. 4.

As shown in FIG. 4, first, the key pair output unit 12 receives PUF information ID_PUF having a data string of 128 bits from the PUF information output unit 11 (step S021).

Next, the key pair output unit 12 inputs the PUF information ID_PUF to a hash function and generates two different prime numbers a and b (step S022).

Next, the key pair output unit 12 inputs the generated prime numbers a and b to a known private key generation function func 1 and a known public key generation function func 2 (steps S023P and S023Q).

The key pair output unit 12 outputs the private key P_PUF generated through the private key generation function func 1 and the public key Q_PUF generated through the public key generation function func 2 (steps S024P and S024Q).

It is to be noted that the processes of generating the private key P_PUF and the public key Q_PUF on the basis of a random number (the PUF information ID_PUF in the present embodiment) are well-known techniques and each process is irreversible. That is, even if the public key Q_PUF leaks out to a third party, it is not possible to obtain the private key P_PUF and the PUF information ID_PUF through backward calculation based on the public key Q_PUF.

The key pair output unit 12 outputs the public key Q_PUF generated in step S023Q to the public key transmitter 13 and outputs the private key P_PUF generated in step S023P to the shared encryption key decryption unit 14 (where the shared encryption key decryption unit 14 is not used in the process flow before shipment).

Returning to FIG. 3, after power is supplied, the CPU 10 of the IC chip 1 reads the boot program stored in the ROM 19 and enters a state of waiting for a request message from the outside (the information distribution device 2). Here, the information distribution device 2 transmits a public key request message to the IC chip 1 (step S01*a*).

The CPU 10 receives the public key request message from the information distribution device 2 via the external communication circuit 16 (step S03).

Upon receiving the public key request message, the CPU 10 accesses the public key transmitter 13 to acquire the public key Q_PUF output from the key pair output unit 12. Then, the CPU 10 transmits the public key Q_PUF to the information distribution device 2 via the external communication circuit 16 (step S04).

The information distribution device 2 receives the public key Q_PUF from the IC chip 1 (step S02*a*).

The information distribution device 2 records the public key Q_PUF received from the IC chip 1 in association with the serial number or the like of the IC chip 1 (step S03*a*).

(Process Flow after Shipment)

FIG. 5 is a second process flow executed by the IC chip and the information distribution device according to the first embodiment.

Next, the process flow executed by the IC chip 1 and the information distribution device 2 after shipment of the IC chip 1 (at the stage where the IC chip 1 has been mounted on the control board B (see FIG. 1)) will be described in detail referring to FIG. 5.

The second process flow shown in FIG. 5 is executed at the stage where the IC chip 1 has been mounted on the control board B at the overseas production base L2 after shipment of the IC chip 1.

Similar to the process flow before shipment (FIG. 3), when power is supplied to the IC chip 1 at the overseas production base L2, the PUF information output unit 11 of the IC chip 1 outputs PUF information ID_PUF unique to the IC chip 1 to the key pair output unit 12 (step S11).

Next, the key pair output unit 12 that has received an input of the PUF information ID_PUF from the PUF information output unit 11 generates a key pair (a pair of a public key Q_PUF and a private key P_PUF) based on the PUF information ID_PUF (step S12). The process of step S12 is also similar to the process of steps S021 to S024P and S024Q shown in FIG. 4.

The key pair output unit 12 outputs the generated public key Q_PUF to the public key transmitter 13 and outputs the generated private key P_PUF to the shared encryption key decryption unit 14 (where the public key transmitter 13 is not used in the process flow after shipment).

On the other hand, the information distribution device 2 generates a shared encryption key SK for encrypting the control program Pdata to be distributed to the IC chip 1 (step S11*a*). The shared encryption key SK may be a random number having a predetermined number of bits.

The information distribution device 2 reads the public key Q_PUF recorded before shipment of the IC chip 1 (recorded in step S03*a* in FIG. 3), encrypts the shared encryption key SK with the public key Q_PUF, and generates the encrypted shared encryption key enc (SK, Q_PUF) (step S12*a*).

After power is supplied, the CPU 10 of the IC chip 1 reads the boot program stored in the ROM 19 and enters a state of waiting for a request message from the outside (the information distribution device 2). Here, the information distribution device 2 transmits an SK decryption request message to the IC chip 1 and further distributes the encrypted shared encryption key enc (SK, Q_PUF) thereto (step S13*a*).

The CPU 10 of the IC chip 1 receives the SK decryption request message and the encrypted shared encryption key enc (SK, Q_PUF) from the information distribution device 2 via the external communication circuit 16 (step S13).

Upon receiving the SK decryption request message, the CPU 10 outputs the subsequently received encrypted shared encryption key enc (SK, Q_PUF) to the shared encryption key decryption unit 14. The shared encryption key decryption unit 14 decrypts the encrypted shared encryption key enc (SK, Q_PUF) using the private key P_PUF output from the key pair output unit 12 (step S14). The shared encryption key decryption unit 14 outputs the shared encryption key SK acquired through the decryption processing to the control program decryption unit 15.

After the shared encryption key decryption unit 14 completes the decryption processing, the CPU 10 waits for a request message from the information distribution device 2 again.

On the other hand, the information distribution device 2 encrypts the control program Pdata for operating the IC chip 1 with the shared encryption key SK generated in step S11*a* (step S14*a*).

Next, the information distribution device 2 transmits a Pdata decryption request message to the IC chip 1 and further distributes the encrypted control program enc (Pdata, SK) thereto (step S15*a*).

Upon receiving the Pdata decryption request message via the external communication circuit 16, the CPU 10 records the subsequently received encrypted control program enc (Pdata, SK) in the flash ROM 18 (step S15).

Subsequently, the control program decryption unit 15 extracts the encrypted control program enc (Pdata, SK) from the flash ROM 18 in units of blocks, sequentially decrypts the extracted encrypted control program enc (Pdata, SK) using the shared encryption key SK output from the shared encryption key decryption unit 14, and loads the decrypted control program into the RAM 17 (step S16).

After the control program decryption unit 15 completes loading the control program Pdata in the RAM 17, the CPU 10 waits for a request message from the information distribution device 2 again.

The information distribution device 2 transmits a control program execution request message to the IC chip 1 (step S16*a*).

Upon receiving the control program execution request message from the information distribution device 2 via the external communication circuit 16, the CPU 10 causes a program counter to jump to the control program Pdata loaded into the RAM 17. This switches the execution program from the boot program to the control program Pdata (step S17).

(Tamper Resistant Functions)

Figure 6:
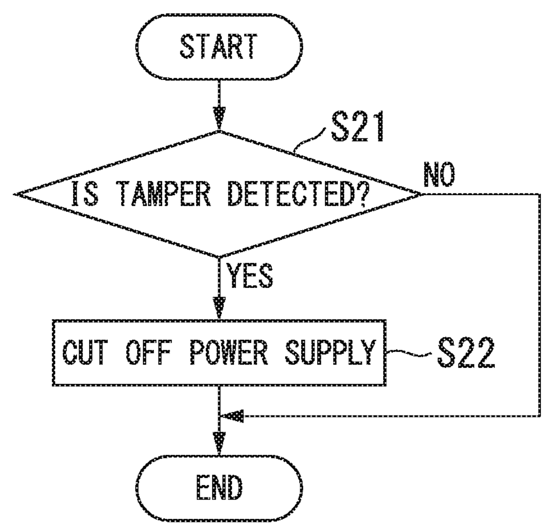
FIG. 6 is a third process flow executed by the IC chip according to the first embodiment.

FIG. 6 is a third process flow executed by the IC chip according to the first embodiment.

Next, the tamper resistant functions of the IC chip 1 will be described with reference to FIG. 6.

The process flow shown in FIG. 6 is a process flow executed by the tamper resistant detector 1A and the power management unit 1B of the IC chip 1 and is always executed repeatedly while power is being supplied to the IC chip 1.

The tamper resistant detector 1A of the IC chip 1 determines the presence or absence of unauthorized interference with the IC chip 1 (for example, package removal or disassembly etc.) (step S21).

When unauthorized interference with the IC chip 1 is not detected (step S21: NO), the same process flow is repeated.

When unauthorized interference with the IC chip 1 is detected (step S21: YES), the power management unit 1B cuts off power supply to the functional components of the IC chip 1 (the PUF information output unit 11, the key pair output unit 12, the RAM 17, and the like) (step S22).

When the power supply is cut off, the control program Pdata loaded into the RAM 17, the PUF information ID_PUF output from the PUF information output unit 11, and information on the private key P_PUF output from the key pair output unit 12 are volatilized.

Operations and Advantages

As described above, the IC chip 1 includes the controller (CPU 10) configured to operate according to a program loaded into the RAM 17, the PUF information output unit 11 configured to output PUF information ID_PUF while power is being supplied, the key pair output unit 12 configured to output a public key Q_PUF and a private key P_PUF based on the PUF information ID_PUF while power is being supplied, the public key transmitter 13 configured to transmit the public key Q_PUF output from the key pair output unit 12 to the outside (the information distribution device 2), and the shared encryption key decryption unit 14 (decryption unit) configured to decrypt encrypted information (a shared encryption key SK) produced through encryption with the public key Q_PUF and received from the outside (the information distribution device 2) with the private key P_PUF output from the key pair output unit 12.

According to this configuration, the encrypted information (the shared encryption key SK) has been encrypted with the public key Q_PUF, and therefore a third party cannot acquire the encrypted information even if they tap a communication line between the domestic development base L1 and the overseas production base L2. In addition, to decrypt information encrypted with the public key Q_PUF, a corresponding private key P_PUF is needed. However, this private key P_PUF is generated only while power is being supplied to the IC chip 1. Therefore, even if a third party who has illegally obtained the IC chip 1 itself disassembles and analyzes the IC chip 1 to which no power is supplied, they cannot read the private key P_PUF.

Thus, according to the IC chip 1 of the first embodiment, it is possible to reduce the risk of leakage of information to be protected.

In addition, in the IC chip 1 according to the first embodiment, the public key transmitter 13 is configured to transmit the public key Q_PUF output from the key pair output unit 12 to the outside before shipment of the IC chip 1. The shared encryption key decryption unit 14 is configured to decrypt the encrypted information (the shared encryption key SK) received from the outside with the private key P_PUF output from the key pair output unit 12 after shipment of the IC chip 1.

By employing this aspect, the public key Q_PUF unique to the IC chip 1 can be acquired before shipping in the case in which mounting of the IC chip 1 is performed at a shipping destination factory (the overseas production base L2). Then, the encrypted information produced through encryption with the public key Q_PUF can be distributed to the IC chip 1 mounted at the shipping destination factory, and the IC chip 1 itself can decrypt the distributed encrypted information with the private key P_PUF.

Further, the shared encryption key decryption unit 14 according to the first embodiment is configured to decrypt the shared encryption key SK, with which information to be protected (the control program Pdata) is encrypted, as the encrypted information with the private key P_PUF output from the key pair output unit 12.

That is, the information distribution device 2 encrypts the information to be protected (the control program Pdata) with the shared encryption key SK and encrypts the shared encryption key SK with the public key Q_PUF and distributes them to the IC chip 1.

Thus, in addition to the encryption of the main protection target (the control program Pdata), encryption of the shared encryption key SK is also performed doubly, and therefore it is possible to further improve security.

In addition, while the processing for the shared key encryption method (the encryption and decryption processing using the shared encryption key SK) is comparatively simple, the public key encryption method (encryption processing with the public key Q_PUF and decryption processing with the private key P_PUF) requires relatively complicated calculation. Here, the control program Pdata has an extremely great amount of information as compared with the shared encryption key SK. Thus, if the control program Pdata is encrypted directly with the public key Q_PUF and then distributed, a large load is applied to decryption processing in the IC chip 1 which has received the encrypted control program Pdata. Therefore, by encrypting the shared encryption key SK having a small amount of information with the public key Q_PUF as in the present embodiment, it is possible to reduce the overall load of the decoding processing in the IC chip 1.

Further, the IC chip 1 according to the first embodiment includes the tamper resistant detector 1A configured to detect unauthorized interference with the IC chip 1, and the power management unit 1B configured to cut off power supply to the functional components of the IC chip 1 when unauthorized interference has been detected.

Even after the control program Pdata is distributed, if a third party obtains a control device on which the control program Pdata is mounted, there may be a risk that they decode the control program Pdata by a technique such as a memory dump or a bus probe. With the above configuration to address this problem, power supply to the functional components of the IC chip 1 (such as the PUF information output unit 11, the key pair output unit 12, and the RAM 17 etc.) is cut off if unauthorized interference is detected. Then, the control program Pdata loaded into the RAM 17, the PUF information ID_PUF output from the PUF information output unit 11, and information on the private key P_PUF output from the key pair output unit 12 are volatilized. This makes it impossible to decrypt the control program Pdata by unauthorized interference of a third party (specifically, by a method using a memory dump or a bus probe).

Second Embodiment

Next, an IC chip (an integrated circuit) according to a second embodiment will be described with reference to FIGS. 7 to 10.

(Process Flow Before Shipment)

Figure 7:
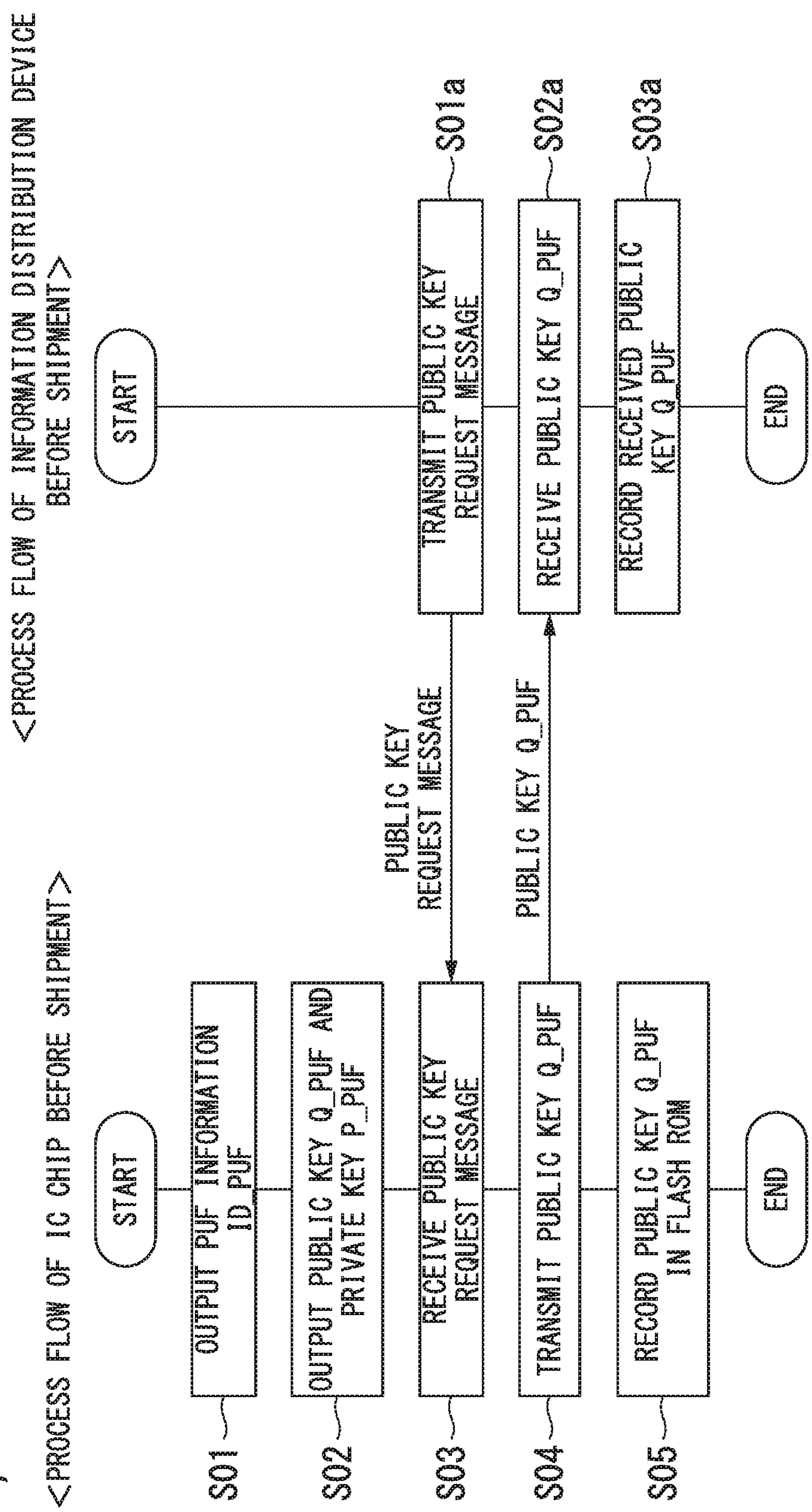
FIG. 7 is a first process flow executed by the IC chip and the information distribution device according to a second embodiment.

FIG. 7 is a first process flow executed by an IC chip and an information distribution device according to the second embodiment.

Hereinafter, a process flow executed by the IC chip 1 and the information distribution device 2 before shipment of the IC chip 1 according to the second embodiment will be described with reference to FIG. 7.

A part of the process flow for the IC chip 1 (steps S01 to S04) and the process flow for the information distribution device 2 (steps S01*a* to S03*a*) shown in FIG. 7 are the same as those of the first embodiment (FIG. 3) and therefore detailed descriptions thereof will be omitted.

As shown in FIG. 7, a CPU 10 according to the second embodiment records public key Q_PUF output from a key pair output unit 12 in a flash ROM 18 provided in the IC chip 1 (step S05).

In the following description, the public key Q_PUF recorded in the flash ROM 18 in step S05 will be referred to as a "reference public key Q_PUFref" and distinguished from a public key Q_PUF output from the key pair output unit 12.

(Process Flow after Shipment)

FIG. 8 is a second process flow executed by the IC chip and the information distribution device according to the second embodiment.

Figure 9:
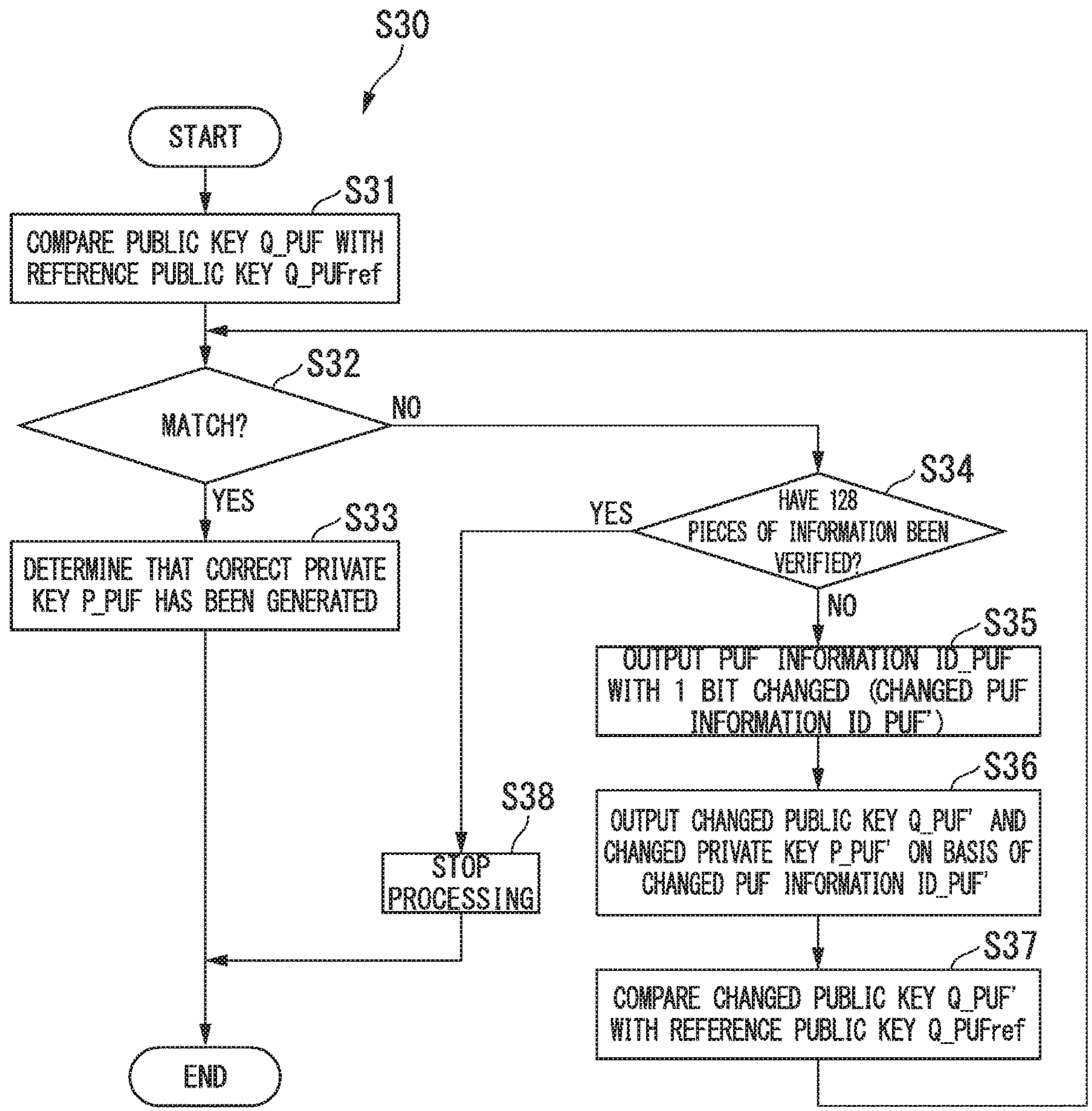
FIG. 9 is a process flow executed by a CPU of the IC chip according to a second embodiment.

FIG. 9 is a process flow executed by the CPU of the IC chip according to the second embodiment.

Hereinafter, the process flow executed by the IC chip 1 and the information distribution device 2 after shipment of the IC chip 1 according to the second embodiment will be described with reference to FIGS. 8 and 9.

A part of the process flow for the IC chip 1 (steps S11 to S17) and the process flow for the information distribution device 2 (steps S11*a* to S16*a*) shown in FIG. 8 are the same as those of the first embodiment (FIG. 5) and therefore detailed descriptions thereof will be omitted.

In the IC chip 1 according to the second embodiment, after the key pair output unit 12 generates a public key Q_PUF and a private key P_PUF in step S12, the CPU 10 verifies the private key P_PUF (step S30).

Hereinafter, the process of step S30 of FIG. 8 performed by the CPU 10 will be described in detail with reference to FIG. 9.

When the public key Q_PUF and the private key P_PUF are output from the key pair output unit 12 after power is supplied to the IC chip 1, the CPU 10 accesses the public key transmitter 13 to acquire the public key Q_PUF output from the key pair output unit 12. Then, the CPU 10 compares the public key Q_PUF with the reference public key Q_PUFref (the public key Q_PUF recorded in the flash ROM 18) (step S31) and determines whether or not they match (step S32).

When the public key Q_PUF output from the key pair output unit 12 and the reference public key Q_PUFref match (step S32: YES), the CPU 10 determines that the private key P_PUF has been correctly output from the key pair output unit 12 (step S33) and shifts to the process of step S13 of FIG. 8.

On the other hand, when the public key Q_PUF output from the key pair output unit 12 and the reference public key Q_PUFref do not match (step S32: NO), the CPU 10 determines that the private key P_PUF has not been correctly output from the key pair output unit 12. In this case, the CPU 10 further executes the following processing.

The CPU 10 determines whether or not 128 pieces of "changed PUF information ID_PUF'" have been verified (step S34). Here, the "changed PUF information ID_PUF'" refers to information obtained through by changing (inverting) 1 bit of the PUF information ID_PUF output from the PUF information output unit 11 at the present time.

When processing described below (steps S35 to S37) has not been performed for the 128 pieces of changed PUF information ID_PUF' (step S34: NO), the CPU 10 causes the PUF information output unit 11 to output a piece of changed PUF information ID_PUF' obtained by changing one bit of the 128-bit information that constitutes the PUF information ID_PUF (step S35).

The key pair output unit 12 generates and outputs a "changed public key Q_PUF'" and a "changed private key P_PUF'" on the basis of the changed PUF information ID_PUF' output from the PUF information output unit 11 (step S36). Here, the "changed public key Q_PUF'" and the "changed private key P_PUF'" refer to a public key and a private key generated through the process flow shown in FIG. 4 on the basis of the changed PUF information ID_PUF' output from the PUF information output unit 11.

Next, the CPU 10 again accesses the public key transmitter 13 to acquire the changed public key Q_PUF' output from the key pair output unit 12. Then, the CPU 10 compares the changed public key Q_PUF' with the reference public key Q_PUFref (step S37) and determines whether or not they match (step S32).

When the changed public key Q_PUF' and the reference public key Q_PUFref match (step S32: YES), the CPU 10 determines that the changed private key P_PUF' output at the present time is a correct private key P_PUF (step S33). Thus, in this case, the CPU 10 decrypts the encrypted shared encryption key enc (SK, Q_PUF) using the changed private key P_PUF' in step S14 of FIG. 8.

On the other hand, when the changed public key Q_PUF' and the reference public key Q_PUFref do not match (step S32: NO), the CPU 10 again causes the PUF information output unit 11 to output a piece of changed PUF information ID_PUF' obtained by changing one bit of the 128-bit information that constitutes the PUF information ID_PUF (step S35). Here, the CPU 10 causes the PUF information output unit 11 to output changed PUF information ID_PUF' which is different from the changed PUF information ID_PUF' output in the previous processing.

When the changed public key Q_PUF' and the reference public key Q_PUFref do not match for any of the 128 pieces of changed PUF information ID_PUF' (step S34: YES), the CPU 10 determines that it is not possible to acquire a correct private key P_PUF and stops the subsequent processing (steps S13 to S17 in FIG. 8) (step S38).

Operations and Advantages

As described above, the IC chip 1 according to the second embodiment includes the flash ROM 18 (nonvolatile memory), and the CPU 10 is configured to record the public key Q_PUF output from the key pair output unit 12 in the flash ROM 18 before shipment.

In addition, the CPU 10 is configured to determine whether or not the public key Q_PUF output from the key pair output unit 12 matches the public key (the reference public key Q_PUFref) recorded in the flash ROM 18 after shipment. The CPU 10 is also configured to determine whether or not the private key P_PUF has been correctly output from the key pair output unit 12 after shipment on the basis of a result of the determination.

Here, since the PUF information ID_PUF output from the PUF information output unit 11 is an output value that depends on physical characteristics unique to the IC chip 1, it can be assumed that its value may change, for example, due to the difference between the environments before and after shipment or due to external factors arising in the course of shipment. If the PUF information ID_PUF output from the PUF information output unit 11 differs before and after the shipment, it is not possible to decrypt information encrypted with the public key Q_PUF acquired before the shipping.

Thus, by employing the above aspect, it is possible to determine whether or not the public key Q_PUF and the private key P_PUF output from the key pair output unit 12 after shipment are the same as those output before shipping.

Further, the PUF information output unit 11 according to the second embodiment is configured to output changed PUF information ID_PUF' obtained by changing a part (1 bit) of the currently output PUF information ID_PUF if a correct private key P_PUF is not output from the key pair output unit 12 after shipment.

The key pair output unit 12 is configured to output a changed public key Q_PUF' and a changed private key P_PUF' based on the changed PUF information ID_PUF'.

The CPU 10 is configured to determine whether or not the changed public key Q_PUF' output from the key pair output unit 12 matches the reference public key Q_PUFref.

The shared encryption key decryption unit 14 is configured to decrypt the encrypted information (the shared encryption key SK) received from the information distribution device 2 with the changed private key P_PUF' if the changed public key Q_PUF' matches the reference public key Q_PUFref.

According to this aspect, even if a part (for example, 1 bit) of the PUF information ID_PUF output from the PUF information output unit 11 changes after shipment, it is possible to acquire a changed private key P_PUF' corresponding to the reference public key Q_PUFref. As a result, the encrypted information (the shared encryption key SK) produced through encryption with the public key Q_PUF recorded before shipment can be correctly decrypted using the changed private key P_PUF'.

Modifications of Each Embodiment

Although the IC chip 1 according to the first and second embodiments has been described above in detail, the specific aspects of the IC chip 1 are not limited to those described above and various design changes or the like can be made without departing from the gist.

For example, each of the above embodiments has been described such that the decryption unit (the shared encryption key decryption unit 14) decrypts the shared encryption key SK, with which the control program Pdata is encrypted, as the encrypted information with the private key P_PUF output from the key pair output unit 12. However, other embodiments are not limited to this aspect. For example, it is possible to employ an aspect in which the decryption unit decrypts the control program Pdata itself as encrypted information with the private key P_PUF output from the key pair output unit 12. It is to be noted that, in this case, the information distribution device 2 distributes an encrypted control program enc (Pdata, Q_PUF) obtained by encrypting the control program Pdata with the public key Q_PUF in step S13*a* of FIG. 5 (FIG. 8).

Further, although the IC chip 1 according to each of the above embodiments has been described as including the tamper resistant detector 1A and the power management unit 1B as tamper resistant functions, these may not be provided depending on the embodiments.

Furthermore, the second embodiment has been described such that the IC chip 1 sets PUF information obtained by changing 1 bit of the PUF information ID_PUF output from the PUF information output unit 11 as changed PUF information ID_PUF' and searches for changed PUF information ID_PUF' from which the reference public key Q_PUFref can be obtained. However, other embodiments are not limited to this aspect.

The CPU 10 of the IC chip 1 according to another embodiment may be configured to set PUF information obtained by changing 2 or more bits of the PUF information ID_PUF output from the PUF information output unit 11 as changed PUF information ID_PUF'.

By doing this, it is possible to improve the possibility of obtaining a correct private key P_PUF.

As is apparent from the above, although some embodiments according to the present invention have been described, all of these embodiments are presented as examples and are not intended to limit the scope of the invention. These embodiments can be implemented in various other forms, and various omissions, substitutions, and changes can be made without departing from the spirit of the invention. These embodiments and modifications thereof are included in the scope and spirit of the invention as well as in the scope of the invention described in the claims and their equivalents.

INDUSTRIAL APPLICABILITY

According to each aspect of the present invention described above, it is possible to reduce the risk of leakage of information to be protected.

REFERENCE SIGNS LIST

1 IC chip (integrated circuit)
10 CPU (controller)
11 PUF information output unit
12 Key pair output unit
13 Public Key transmitter
14 Shared encryption key decryption unit (decryption unit)
15 Control program decryption unit
16 External communication circuit
17 RAM (volatile memory)
18 Flash ROM (nonvolatile memory)
19 ROM (nonvolatile memory)
1A Tamper resistant detector
1B Power management unit
2 Information distribution device
9 Information distribution system
L1 Domestic development base
L2 Overseas production base
B Control board
Pdata Control program

The invention claimed is:

1. An integrated circuit comprising:

a controller configured to operate according to a program;

a physically unclonable function (PUF) information output unit configured to output PUF information while power is being supplied;

a key pair output unit configured to output a public key and a private key based on the PUF information while power is being supplied;

a public key transmitter configured to transmit the public key output from the key pair output unit to an outside; and a decryption unit configured to decrypt encrypted information, produced through encryption with the public key and received from the outside, with the private key output from the key pair output unit, wherein the decryption unit is configured to decrypt a shared encryption key, with which information to be protected is encrypted, as the encrypted information with the private key output from the key pair output unit, the shared encryption key being encrypted with the public key output from the key pair output unit, and the information to be protected being a control program for a control device, the integrated circuit further comprising:

a tamper resistant detector configured to detect unauthorized interference; and a power management unit configured to, when unauthorized interference is detected, cut off power supply to functional components of the PUF information output unit, the key pair output unit, and a RAM of the integrated circuit, the private key is generated only while power is being supplied to the integrated circuit, and when the power supply is cut off, the control program which is loaded into the RAM, the PUF information output from the PUF information output unit, and information on the private key output from the key pair output unit are volatized.

2. The integrated circuit according to claim 1, wherein the public key transmitter is configured to transmit the public key output from the key pair output unit to the outside before shipment, and the decryption unit is configured to decrypt the encrypted information received from the outside with the private key output from the key pair output unit after shipment.

3. The integrated circuit according to claim 1, further comprising a nonvolatile memory, wherein the controller is configured to:

record the public key output from the key pair output unit in the nonvolatile memory before shipment;

determine whether or not the public key output from the key pair output unit matches the public key recorded in the nonvolatile memory after shipment; and determine whether or not the private key has been correctly output from the key pair output unit after shipment on the basis of a result of the determination.

4. The integrated circuit according to claim 3, wherein the PUF information output unit is configured to output changed PUF information obtained by changing a part of the output PUF information if a correct private key is not output from the key pair output unit after shipment;

the key pair output unit is configured to output a changed public key and a changed private key based on the changed PUF information, the controller is configured to determine whether or not the changed public key output from the key pair output unit matches the public key recorded in the nonvolatile memory, and the decryption unit is configured to decrypt the encrypted information received from the outside with the changed private key if the changed public key matches the public key recorded in the nonvolatile memory.

5. A control device comprising the integrated circuit according to claim 1.

6. An information distribution method for distributing information to the integrated circuit according to claim 1, the information distribution method comprising the steps of:

supplying power to the integrated circuit and causing the integrated circuit to transmit a public key based on PUF information to the outside before shipment of the integrated circuit;

generating encrypted information through encryption with the public key received from the integrated circuit; and supplying power to the integrated circuit and causing the integrated circuit to receive the encrypted information from the outside and to decrypt the encrypted information with the private key based on the PUF information after shipment of the integrated circuit.

7. An information distribution system comprising:

the integrated circuit according to claim 1; and an information distribution device, wherein the information distribution device is configured to:

record the public key received from the integrated circuit; and generate the encrypted information using the recorded public key and distribute the encrypted information to the integrated circuit.

* * * * *